(12) United States Patent
Chevalier (10) Patent No.: US 9,910,636 B1
(45) Date of Patent: Mar. 6, 2018

(54) VOICE ACTIVATED AUDIO CONTROLLER

(71) Applicant: Jeremy M. Chevalier, Prince George (CA)

(72) Inventor: Jeremy M. Chevalier, Prince George (CA)

( * ) Notice: Subject to any disclaimer, the term of this patent is extended or adjusted under 35 U.S.C. 154(b) by 24 days.

(21) Appl. No.: 15/179,092

(22) Filed: Jun. 10, 2016

(51) Int. Cl.
| H04R 1/10 | (2006.01) |
| G06F 3/16 | (2006.01) |
| H04R 1/02 | (2006.01) |
| H04R 1/04 | (2006.01) |
| H04R 1/08 | (2006.01) |

(52) U.S. Cl.
CPC ............. *G06F 3/167* (2013.01); *G06F 3/162* (2013.01); *H04R 1/028* (2013.01); *H04R 1/04* (2013.01); *H04R 1/083* (2013.01)

(58) Field of Classification Search
CPC ......... G06F 3/167; G06F 3/162; H04R 1/028; H04R 1/04; H04R 1/083
USPC ............... 381/370, 375, 376, 385; 704/275; 379/430; 2/906
See application file for complete search history.

(56) References Cited

U.S. PATENT DOCUMENTS

| RE34,525 E | * | 2/1994 | Lazzaroni | ............... A42B 3/04 2/422 |
| 6,075,857 A | * | 6/2000 | Doss, Jr. | ................. A42B 3/30 379/430 |
| 7,110,743 B2 | * | 9/2006 | Depew | ..................... A42B 3/30 381/375 |
| 7,308,108 B2 | * | 12/2007 | Davis | ....................... A42B 3/30 381/370 |
| 8,498,425 B2 | | 7/2013 | Graylin | |
| 8,543,397 B1 | | 9/2013 | Nguyen | |
| 9,060,221 B1 | * | 6/2015 | Kaplan | .................... A42B 3/30 |
| 2009/0002161 A1 | * | 1/2009 | Luciani | ............... A42B 3/0466 340/568.6 |
| 2009/0204410 A1 | * | 8/2009 | Mozer | ..................... G10L 15/30 704/275 |
| 2012/0077438 A1 | | 3/2012 | Jung | |
| 2012/0078635 A1 | | 3/2012 | Rothkopf et al. | |

(Continued)

*Primary Examiner* — Vivian Chin
*Assistant Examiner* — Friedrich W Fahnert
(74) *Attorney, Agent, or Firm* — Robert C. Montgomery; Montgomery Patent & Design (57) ABSTRACT

A control device for a portable digital media player is contained within a communications headset attached to a first ear of a user and complimented by an interpreter circuit adaptively paired with that media player. A microphone, located within the headset, is configured to receive vocal commands from the user and transmit those commands, via any wireless communication technology, to the interpreter interface removably inserted into a specialized port of the media player. The electronic circuitry within the adapter searches the input for recognizable phrases which have been pre-programmed to exert control over the media player. The adapter then converts the proper input into control signals for execution in the media player. The output of the media player is wirelessly transmitted back to the headset for the auditory enjoyment of the user. The headset is equipped with an auxiliary earpiece which is configured to wirelessly receive at least a portion of the media player output to accomplish a stereoscopic presentation when that earpiece is inserted into the auditory canal of a second ear.

18 Claims, 7 Drawing Sheets

(56) References Cited

U.S. PATENT DOCUMENTS

| | | |
|---|---|---|
| 2013/0217370 A1 | 8/2013 | Gerald et al. |
| 2014/0273863 A1 | 9/2014 | Luizzi |
| 2014/0358535 A1 | 12/2014 | Lee et al. |
| 2015/0080061 A1 | 3/2015 | Dieringer |
| 2015/0365757 A1* | 12/2015 | Abreu .............. G02C 3/003 381/381 |
| 2016/0377891 A1* | 12/2016 | Abreu .............. G02C 3/003 348/158 |

* cited by examiner

VOICE ACTIVATED AUDIO CONTROLLER

FIELD OF THE INVENTION

The present invention relates generally to voice-activated controls for portable audio devices, and in particular, to a portable voice-activated controller for a portable audio device.

BACKGROUND OF THE INVENTION

Portable audio devices such as an IPOD®, along with a headset such as ear buds, are a popular means of audio entertainment while riding motorcycles, snowmobiles, and similar vehicles. This is true because these devices are compact, durable, and capable of storing hours of entertainment while likewise enabling a rider of a motorcycle or the like to hear the audio output above the engine noise.

A primary issue with the use of such devices while riding a vehicle is that they are not hands-free. That is to say, that in order to change tracks, change volume levels, change playback modes and the like, the user has to stop or park the vehicle, perform the desired operation on the portable audio device and begin riding again. Attempting to manipulate and control a portable audio device while riding is known to significantly increase the risks of accidents and injury.

Various attempts have been made to provide hands-free electronic controls for various devices. Examples of these attempts can be seen by reference to several U.S. patents, including U.S. Pat. No. 4,401,852; U.S. Pat. No. 4,573,187; U.S. Pat. No. 5,602,963; U.S. Pat. No. 6,240,347; U.S. Pat. No. 6,339,706; U.S. Pat. No. 6,397,186; and U.S. Pat. No. 7,382,760. However, none of these designs are similar to the present invention.

While these devices fulfill their respective, particular objectives, each of these references suffer from one (1) or more of the aforementioned disadvantages. Many such devices are integral to particular electronic systems and cannot be used on a portable vehicle. Many such devices are not readily integrated into a cyclist's existing equipment. Also, many such devices are not adapted for use with the most common current portable audio devices such as an IPOD®. Accordingly, there exists a need for a voice activated controller without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a voice-activated audio controller comprising a mouthpiece which is capable of being removably mounted to an inside surface of a helmet worn by a user, a headset which is capable of being worn by the user and an interface device which is capable of being removably connected to a portable audio device. The interface device is in wireless communication with the mouthpiece and the headset. In a separate embodiment the controller comprises a helmet with the mouthpiece removably mounted to an inside surface of the helmet and an interface device. The wireless communication between the mouthpiece, the headset, and the interface device may incorporate BLUETOOTH® technology.

When the portable audio device is remotely positioned on the user within a pre-determined range, the mouthpiece is capable of receiving spoken commands from the user and transmits the spoken commands to the interface device. The spoken commands constitute a control parameter which provides operational control over the portable audio device. The interface device is also capable of transmitting audio signals generated by the portable audio device to the headset.

The mouthpiece comprises a polygonal-shaped housing defining an interior space having a removable first face, which comprises a sound wave permeable open grill structure, a microphone power source located within the housing, a microphone circuit which is in electrical communication with the microphone power source, a microphone transmitter which is in electrical communication with the microphone circuit, a mounting means capable of removably securing a second face of the housing to the helmet and a pair of clamps. Each clamp comprises a block having a plurality of ridges and a block channel which is secured within the block. Each clamp is secured to a housing first side and a housing second side opposite the housing first side. The first face may also comprise of a sound wave permeable open grill structure.

The mouthpiece may also comprise a pair of retainers with each retainer comprising a symmetrical bifurcated claw which has a first aperture that is superjacent to a second aperture, a retaining wire which comprises an upper portion which has a first free proximal end and a lower portion which has a second free proximal end resulting in the formation of an open loop at a distal end. The first face proximal end is secured within the housing through a first housing aperture which is located within the housing first side and subjacent a respective block. The second face proximal end is secured within the housing through a second housing aperture which is located within the housing second side and subjacent a respective block. Each claw is movably secured within a respective block channel while each retaining wire is movably secured with a respective claw. Each loop is capable of being removably secured to a retaining structure located within the helmet. The microphone circuit converts the spoken commands directed into the first face to a first signal and the microphone transmitter transmits the first signal to the interface device.

The interface device may also comprise an interface housing. The housing comprises an interface connector having a plurality of contacts capable of electrically interconnecting with a control jack of the portable audio device, a transceiver which is housed within the interface housing, a microcontroller which is housed within the interface housing and in electrical communication with the transceiver and an output controller which is housed within the interface housing and in electrical communication with the microcontroller and the interface connector. The interface device is capable of obtaining power from the on-board power source of the portable audio device. The transceiver receives and amplifies the first signal from the mouthpiece. The microcontroller receives the first signal and issues an output command capable of operably controlling the portable audio device. The output controller receives the output command and transmits it to the interface connector. The transceiver is capable of converting an audio output from the portable audio device into a second signal and transmitting the second signal to the headset.

The headset may further comprise a pair of ear buds. Each ear bud comprises an exterior face, a handle secured to the exterior face, a power source secured within each the ear bud, an ear bud receiver in electrical communication with the power source and an ear bud speaker in electrical communication with the ear bud receiver. The pair of ear buds are adapted to be inserted into ears of the user and each ear bud receiver receives the second signal from the interface device and coverts it to an audio signal to be transmitted through the pair of ear buds.

The mounting means may be a hook and loop fastener. The spoken commands may include, "volume up", which increases a volume of the portable audio device, "volume down", which decreases the volume of the portable audio device, "next track", which skips to a subsequent track of a playlist on the portable audio device, "previous track", which plays a previous track of the playlist on the portable audio device, "random", which randomly plays a track on the playlist on the portable audio device and "shuffle", which randomly sorts a listing of tracks of the playlist and commences playback on the portable audio device.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 controller
20 mouthpiece
22 microphone housing
23a microphone housing first face
23b microphone housing second face
23c microphone housing first side
23d microphone housing second side
24 housing face
26 interior
28 first attachment strip
30 second attachment strip
32 housing aperture
34 microphone battery
36 microphone circuitry
38 microphone transmitter
40 clamp
42 block
44 ridge
46 channel
48 clamp mount
50 retainer
51 claw
52a first aperture first half
52b first aperture second half
54a second aperture first half
54b second aperture second half
56 retaining wire
57a upper portion
57b lower portion
59a proximal upper portion
59b proximal lower portion
58 loop
60 headset
62 ear bud
63 exterior face
64 ear bud battery
65 handle
66 ear bud receiver
68 ear bud speaker
70 interface device
72 interface housing
74 interface connector
76 contact
82 transceiver
84 microcontroller
86 output controller
92 sound wave
94 first signal
96 second signal
100 user
105 helmet
110 helmet lining
115 portable audio device

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a controller (herein referred to as the "apparatus") 10 for a portable audio device 115, which provides a means for a user 100 to influence various settings of the portable audio device 115 in a hands-free fashion by speaking commands, which include but are not limited to, "volume up" which increases a volume of said portable audio device, "volume down" which decreases said volume of said portable audio device, "next track" which skips to a subsequent track of a playlist on said portable audio device, "previous track" which plays a previous track of said playlist on said portable audio device, "random" which randomly plays a track on said playlist on said portable audio device and "shuffle" which randomly sorts a listing of tracks of said playlist and commences playback on said portable audio device while simultaneously enjoying the use of that portable audio device 115 during engagement in an activity involving the wearing of a protective helmet 105. The apparatus 10 is not limited by the configuration of the helmet 105 or to any portable audio device 115 which a user 100 may choose to select, so long as an interface device 70 may suitable be connected to the portable audio device 115.

Figure 1:
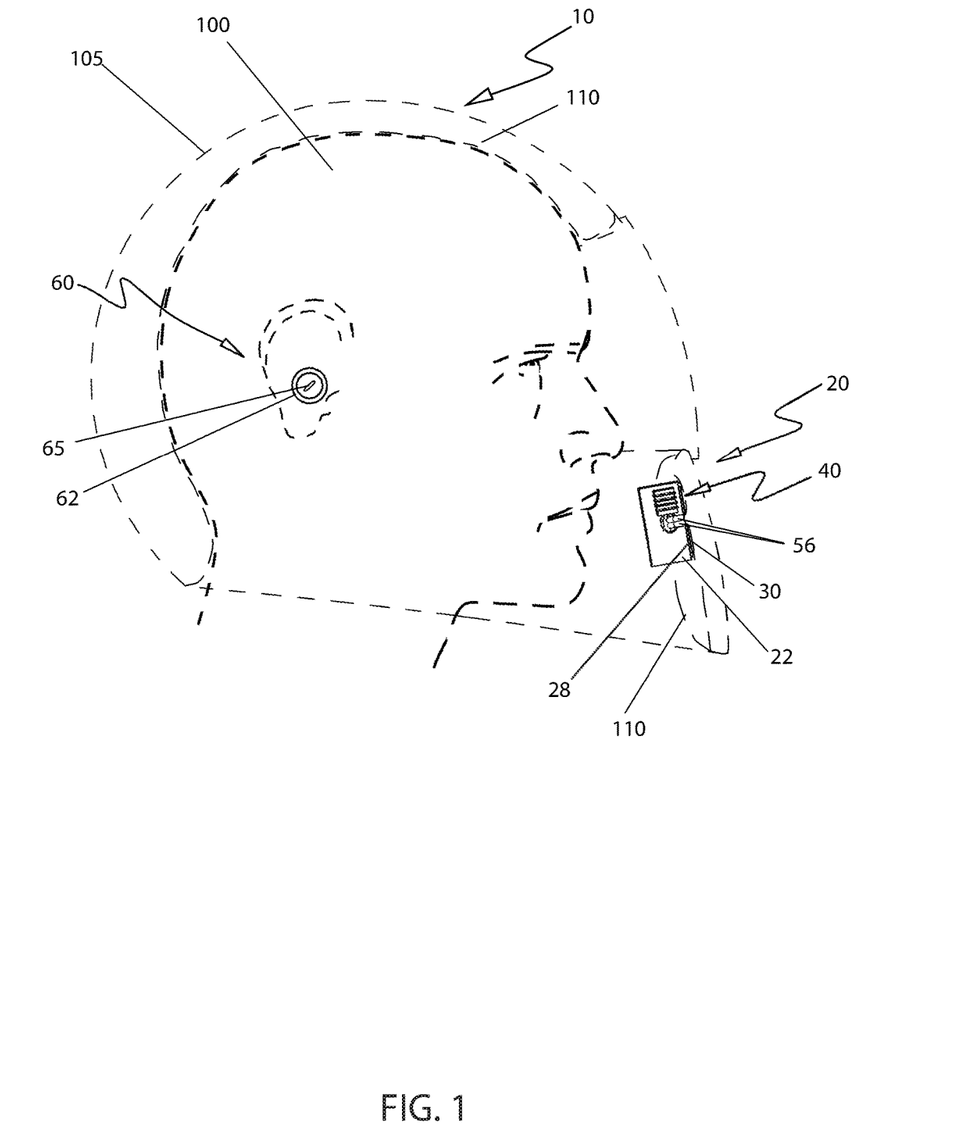
FIG. 1 is a sectional view of a helmet 105 provided with a controller 10 for a portable audio device 115 in accordance with the preferred embodiment of the present invention.
Figure 2:
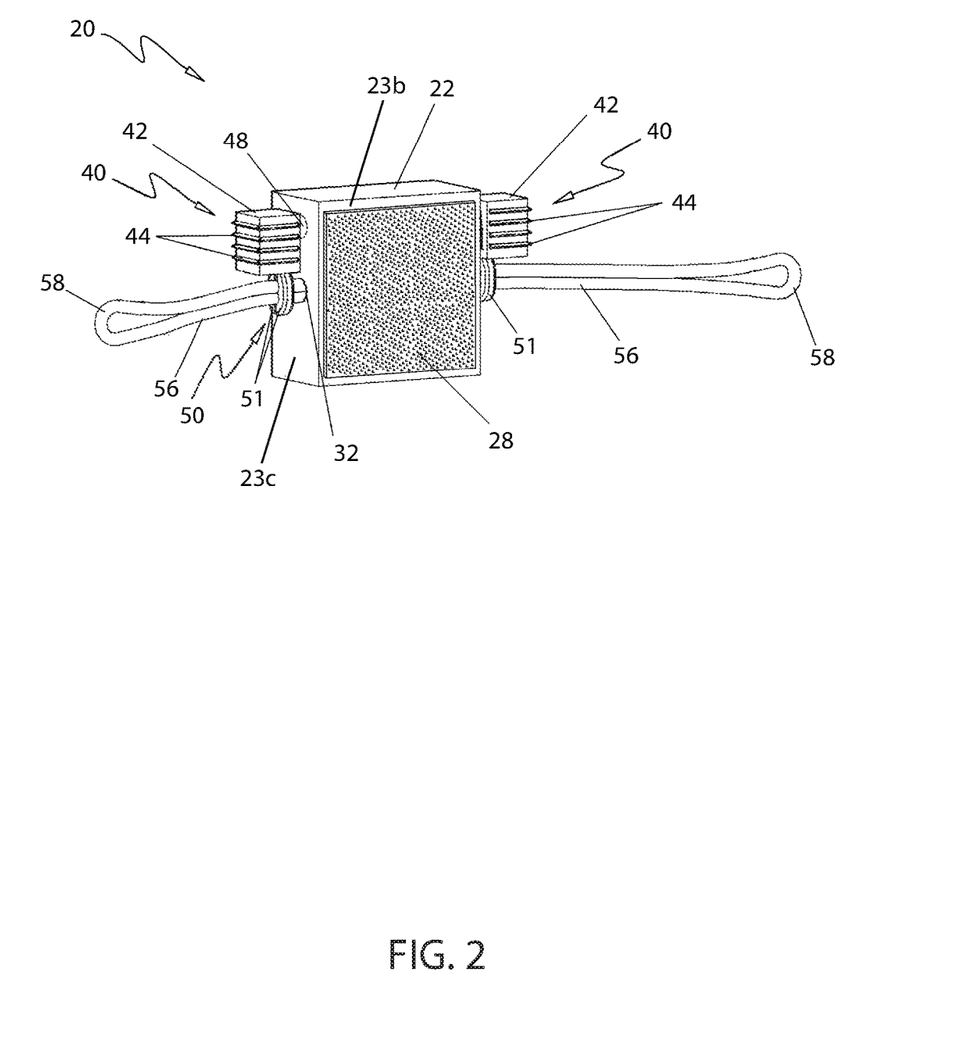
FIG. 2 is an isolated view of a mouthpiece 20 of the controller 10 in accordance with the preferred embodiment of the present invention.
Figure 5:
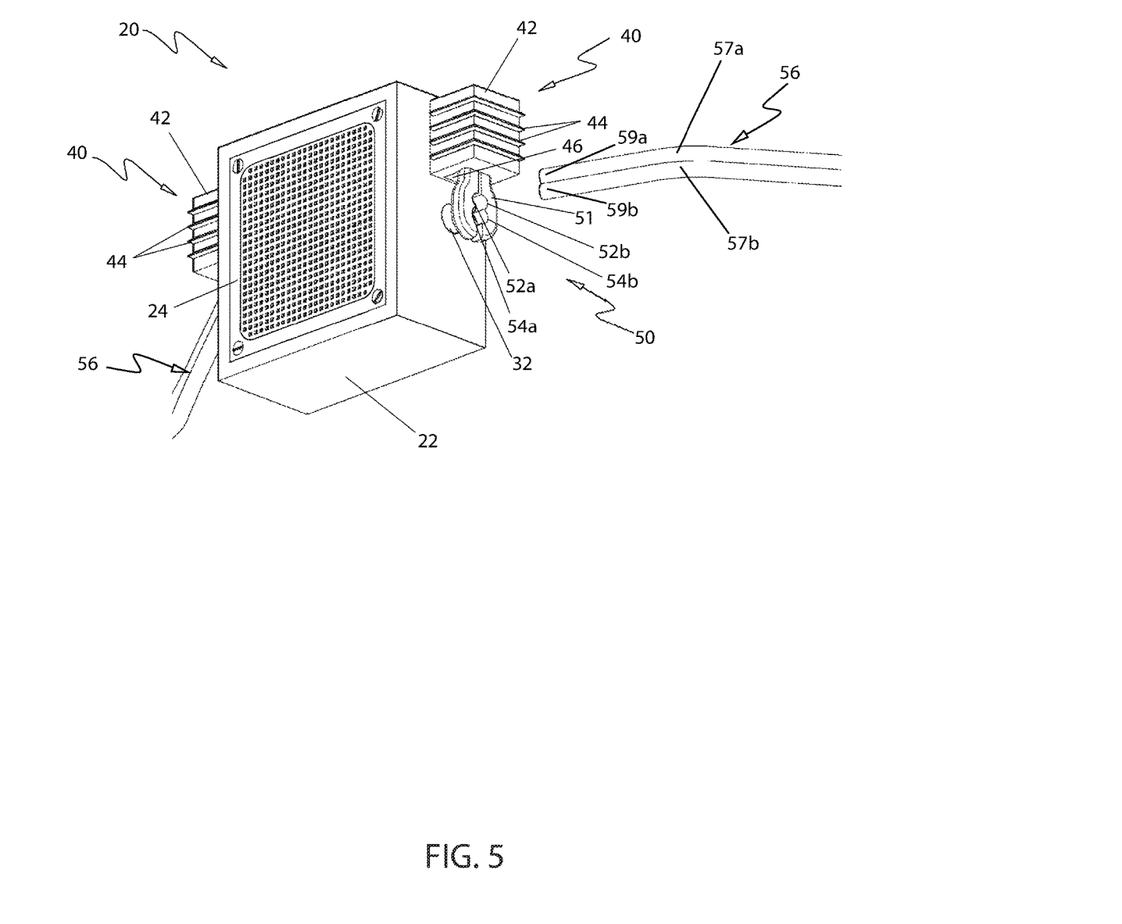
FIG. 5 is an isolated view of a clamp 40 of the mouthpiece 20 in an open configuration to release a retaining wire 56 of the controller 10 in accordance with the preferred embodiment of the present invention.

Referring now to FIG. 1, a section view of a helmet 105 provided with the apparatus 10, FIG. 2, an isolated view of a mouthpiece 20, and FIG. 5, an isolated view of a clamp 40 of the mouthpiece 20 of the apparatus 10, according to the preferred embodiment of the present invention, are disclosed. The apparatus 10 includes a mouthpiece 20, a headset 60, composed of two (2) ear buds 62, and an interface device 70. The mouthpiece 20 is configured to be removably attached to an interior surface of the helmet 105 in proximity to the mouth of a user 100 by means of a first attachment strip 28 and a second attachment strip 30. The attachment strips 28, 30 are composed of the complimentary portions of a hook-and-loop fastener, such as VELCRO®, or the like. The second attachment strip 30 is permanently bonded to an interior portion of a helmet 105 by suitable mastic. The technique utilized to achieve a permanent adherence would be dictated by the foundation material and would not be seen as a limiting factor in the scope of the apparatus 10. The first attachment strip 28 is disposed upon a surface of a microphone housing second face 23b on that side opposite from a housing face 24. Whether the first attachment strip 28 is composed of either a hooks portion of the hook-and-loop fastener, or the loops portion thereof, is immaterial so long as the second attachment strip 30 constitutes the complimentary portion, and should not be viewed as a limiting factor in the scope of the apparatus 10.

The mouthpiece 20 consists of the microphone housing 22, further comprising a microphone housing first face 23a, a microphone housing second face 23b, a microphone housing first side 23c and a microphone housing second side 23d with a pair of clamps 40 disposed along opposing microphone housing sides 23c, 23d. The microphone housing 22 is preferably configured to be a cubic polyhedron fabricated of a molded thermoplastic with a removable housing face 24 and a hollow interior 26. The housing face 24 is provided with an open grille structure through which sound waves 92 are capable of passing without measurable distortion. The housing face 24 is removably secured to the housing first face 23a by means of threaded fasteners, or other suitable attachment means, to permit a user 100 to service those components disposed within the interior 26.

The clamps 40 are each attached to the microphone housing first side 23c and a microphone housing second side 23d respectively at preferably cylindrical clamp mounts 48 formed with, or otherwise permanently attached, thereto. A retainer 50 is mounted onto each clamp mount 48. The retainers 50 are configured to be symmetrical, bifurcated, elongated claws 51 having cylindrical apertures formed therein. The retainers 50 are each intended to be contained within a block 42. A plurality of ridges 44 is disposed along three (3) exterior faces of each block 42. The ridges 44 facilitate grasping of the blocks 42 by a user in order to displace the blocks 42 relative to the retainers 50. A channel 46 is formed into each block 42 to allow the displacement of each block 42 relative to the respective retainer 50. The channels 46 are sized to accommodate the inclusion of the clamp mounts 48 therein in all positional circumstances.

A retaining wire 56 comprising an upper portion 57a, a lower portion 57b, a proximal upper portion 59a, a proximal lower portion 59b and a distal loop 58 is secured in each retainer 50 as a secondary means of attaching the mouthpiece 20 within the helmet 105. The retaining wire 56 is configured to be any cylindrical, preferably metallic, structure which can be appropriately retained within the claws 51 of the retainer 50 when the blocks 42 are positioned to maintain the claws 51 in a proximal position. The retaining wires 56 are formed into a circuitous loop comprising the upper portion 57a, the lower portion 57b, the proximal upper portion 59a, the proximal lower portion 59b and the distal loop 58 with the proximal ends 59a, 59b thereof inserted through the retainer 50 and positioned within the interior 26 of the microphone housing 22 via respective housing apertures 32 located subjacent to the clamp mounts 48.

The blocks 42, as illustrated in FIG. 5, are selectively positioned relative to the retainers 50 so as to allow a gap to exist between the claws 51 in an open configuration. A first aperture first half 52a and a second aperture first half 54a are disposed along a single claw 51 of the retainer 50. A first aperture second half 52b and a second aperture second half 54b are disposed in an adjacent face of the opposing claw 51. When the block 42 is displaced in the appropriate manner, the respective claws 51 of the retainers 50 are closed in a fashion to place an encircling first aperture 52a, 52b and a completed second aperture 54a, 54b around the proximal upper portion 59a and the proximal lower portion 59b of the retaining wire 56 respectively to secure the retaining wire to the microphone housing 22. The channel 46 in each block 42 is specifically configured to close the claws 51 of the retainer 50 in a given position and permit the claws 51 to open in an alternate position.

Figure 3:
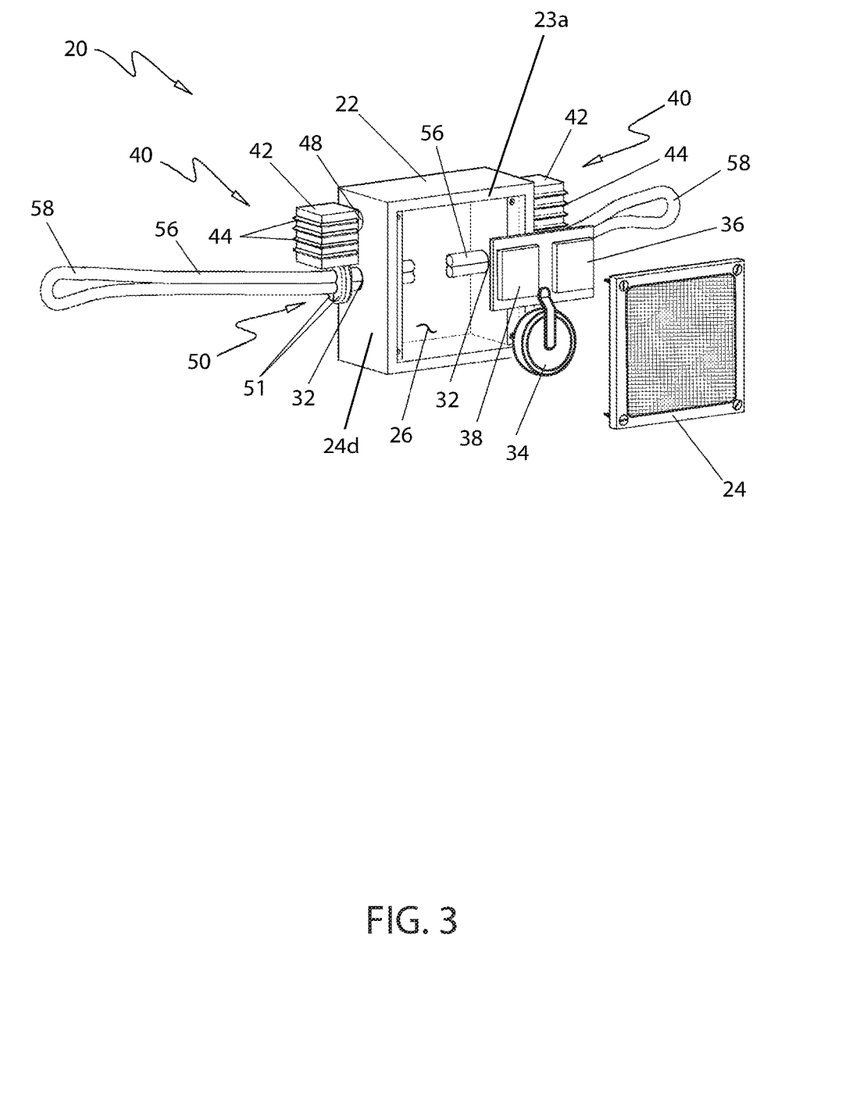
FIG. 3 is an exploded view of the mouthpiece 20 of the controller 10 in accordance with the preferred embodiment of the present invention.

Referring now to FIG. 3, an exploded view of the mouthpiece of the apparatus 10, according to the preferred embodiment of the present invention, is disclosed. Disposed within the interior 26 of the microphone housing 22 are a microphone battery 34, microphone circuitry 36, and a microphone transmitter 38. The microphone battery 34 is preferably a commercially available, button-type battery utilized to supply an electrical current to the microphone circuitry 36 and the microphone transmitter 38. Other power sources, such as a capacitor, or other devices of known technology, may be utilized without limiting the scope of the apparatus 10.

Figure 7:
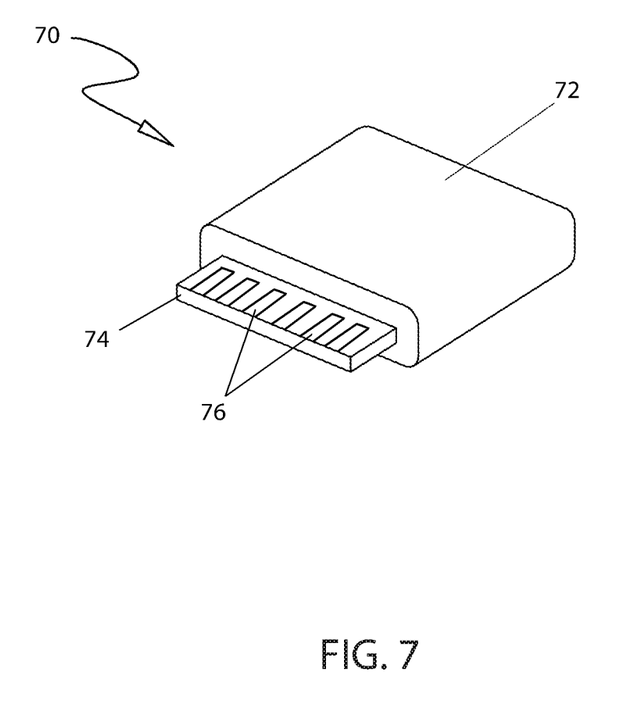
FIG. 7 is an isolated view of an interface device 70 of the controller 10 in accordance with the preferred embodiment of the present invention; and, FIG. 8 is an electrical block diagram of the controller 10 in accordance with the preferred embodiment of the present invention.
Figure 8:
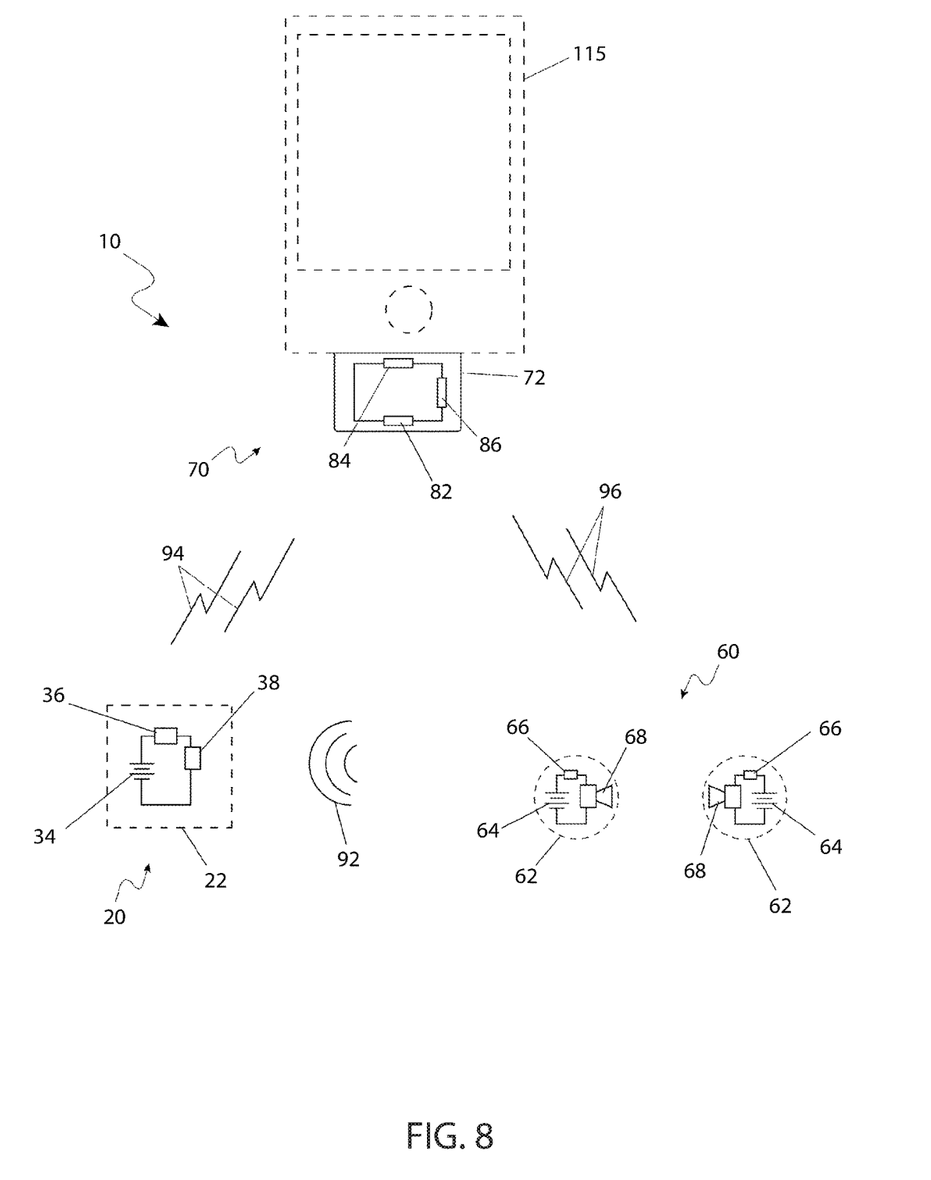

The microphone circuitry 36 consists of any standard, or heretofore developed, system of components having the capability of converting sound waves 92, issuing from the user 100, as schematically illustrated in FIG. 8, into a modulated electrical signal for the microphone transmitter 38. The microphone transmitter 39 emits a first signal 94 to the interface device 70, as shown in FIG. 7, and depicted schematically in FIG. 8. The first signal 94 is transmitted wirelessly, preferably as a pulsed signal of BLUETOOTH® technology.

Figure 4:
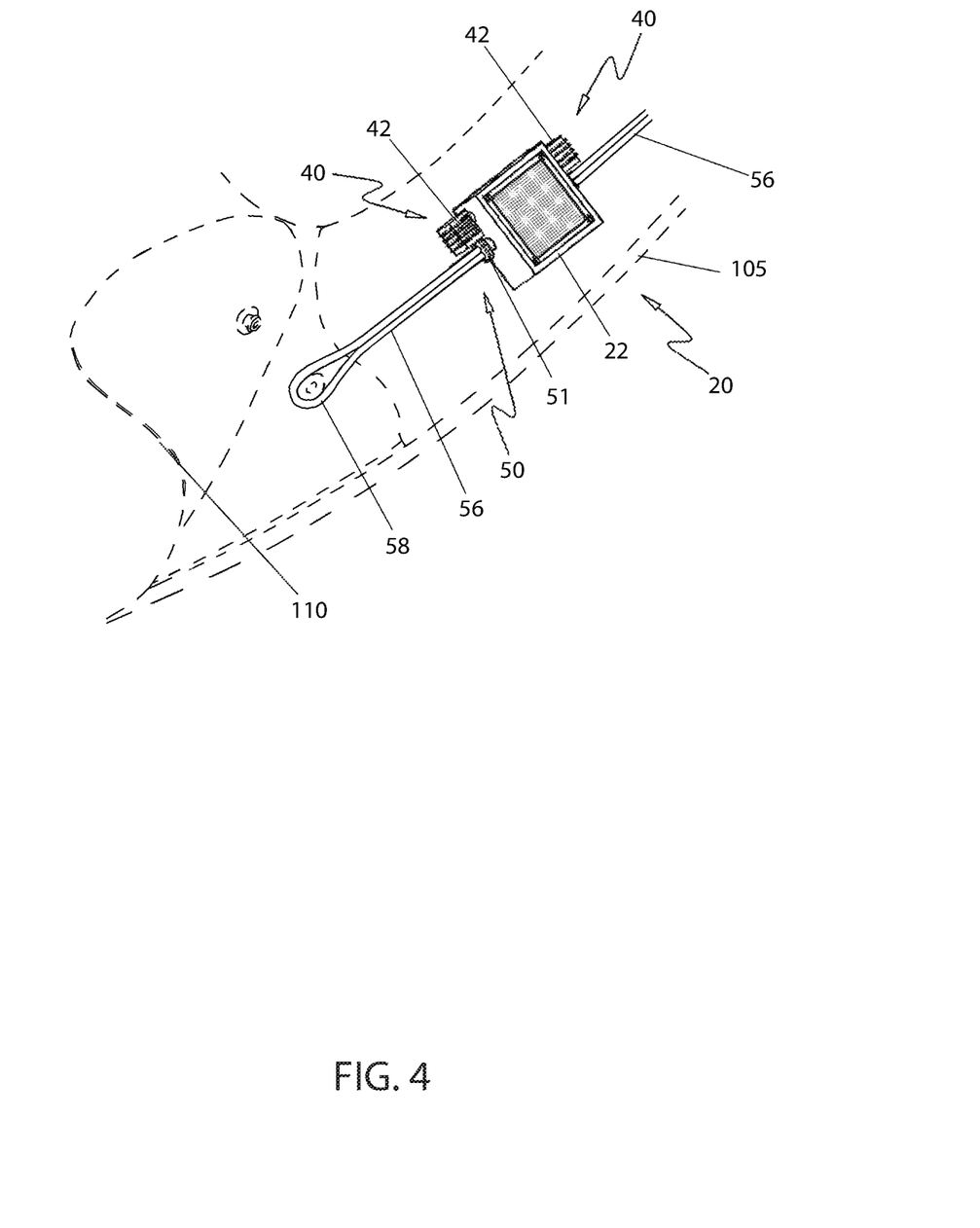
FIG. 4 is an isolated view of the mouthpiece 20 being installed in a helmet 105 in accordance with the preferred embodiment of the present invention.

Referring now to FIG. 4, an isolated view of the mouthpiece 20 of the apparatus 10 being installed in a helmet 105, according to the preferred embodiment of the present invention, is disclosed. In use, the mouthpiece 20 is placed into the helmet 105 and connected thereto by engaging the first attachment strip 28, located on the microphone housing 22, with the second attachment strip 30, located inside the helmet 105. The loop 58 of each retaining wire 56 is placed in proximity to some retaining structure, such as a snap, or the like, of the helmet lining 110 so that when that retaining structure is properly engaged, the loop 58 is captured therein. The retaining wires 56 are then routed through the respective retainer 50 and housing aperture 32. The block 42 is displaced away from the microphone housing 22 and toward the retaining wire 56 so that the first aperture first half 52a is brought into juxtaposition with the first aperture second half 52b to close around, and retain, a first end of the retaining wire 56. Simultaneously, the second aperture first half 54a is placed into juxtaposition with the second aperture second half 54b to close around a second end of the retaining wire 56.

Figure 6:
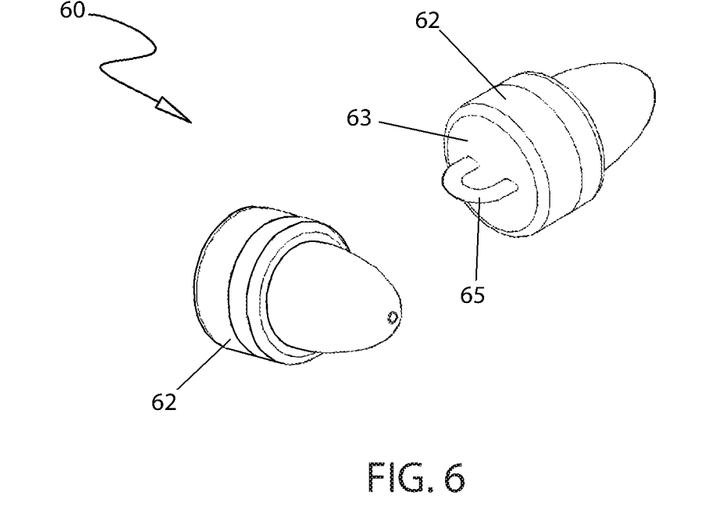
FIG. 6 is an isolated view of a headset 60 of the controller 10 in accordance with the preferred embodiment of the present invention.

Referring now to FIG. 6, an isolated view of a headset 60 of the apparatus 10, according to the preferred embodiment of the present invention, is disclosed. The headset 70 consists of a pair of ear buds 62, which are inserted into the ears of a user 100, as portrayed in FIG. 1, and secured therein by a friction fit. Each ear bud 62 is configured to conform comfortably to the respective outer ear and a portion of the auditory canal of that ear. An arcuate handle 65 is disposed on a circular, planar exterior face 63 of each ear bud 62. The handle 65 is configured to provide a grasping surface to facilitate the removal of the respective ear bud 62 from the ear of a user 100. Each ear bud 62, as schematically pictured in FIG. 8, is provided with an ear bud battery 64, an ear bud receiver 66, and an ear bud speaker 68. The interface device 70 wirelessly transmits a second signal 96 to each ear bud receiver 66, which is converted by the respective ear bud speaker 68 into an audio program for the enjoyment of the user 100. The second signal 96 is envisioned to be appropriately adjusted to provide only a portion thereof to each ear bud 70 so as to affect a stereophonic presentation of the program. It is understood that the second signal 96 may be transmitted in any acceptable format, such as BLUETOOTH® technology, without limiting the scope of the apparatus 10. The ear bud battery 64 may be any commercially available power source having sufficient electrical energy to drive the ear bud receiver 66 and the ear bud speaker 68.

Referring now to FIG. 7, an isolated view of the interface device 70, and FIG. 8, an electrical block diagram of the apparatus 10, according to the preferred embodiment of the present invention, are disclosed. The interface device 70 is comprised of electronic circuitry capable of receiving a wireless first signal 94 from the microphone transmitter 38, as previously discussed, converting that first signal 94 to an electrical impulse via a transceiver 82, sorting selected operational commands from other extraneous impulses through a microcontroller 84, and emitting a wireless, modulated second signal 96, again via the transceiver 82 to the individual ear bud receivers 66.

The interface device 70 is conformal coated having an interface housing 72 of rectangular polygonal shape. Disposed along an edge of the interface housing 72 is an interface connector 74 configured to be selectively inserted into an appropriate receptacle of the portable audio device 115. The interface connector 74 is retained in the portable audio device 115 by means of a friction fit and is in electrical communication therewith by means of a plurality of contacts 76 uniformly disposed along at least one (1) side of the interface connector 74. The portable audio device 115 is provided with matched, auxiliary components to the contacts 76 to permit the microcontroller 84 to exercise proper control thereof and to receive electrical impulses which are then converted by the output controller 84 to the properly sequenced second signal 96.

The interface device 70 receives power for electrical function through at least one (1) of the contacts 76. It is envisioned that multiple embodiments of the interface device 70 may exist in order to comply with a variety of portable audio devices 110. It is understood that, in these alternate embodiments, there may be some variation in the configuration of the contacts 76, and the presence of additional components, without limiting the scope, or the teachings, of this apparatus 10.

The preferred embodiment of the present invention can be utilized by an enabled individual in a simple and straightforward manner with little or no training. After initial purchase or acquisition of the apparatus 10, it would be installed as indicated in FIG. 1. The method of installing and utilizing the apparatus 10 may be achieved by performing the following steps: acquiring a model of the apparatus 10 conforming to the portable audio device 115; removing the housing face 24 from the microphone housing 22; installing, or replacing the microphone battery 34 as necessary; replacing the housing face 24; attaching the second attachment strip 30 onto the selected interior surface of the helmet 105 according to the proscribed manner; attaching the microphone housing 22 to the interior of the helmet 105 by engaging the first attachment strip 28 with the second attachment strip 30; deploying the retaining wires 56 as previously described in this narrative to conform to the securement features of the helmet lining 110 of the helmet 105; inserting ear bud batteries 64 into the individual ear buds 62; grasping the handle 65 of the ear buds 62 properly inserting the ear buds 62 into the ears of the user 100; inserting the interface connector 74 into the selected portable audio device 115, assuring the proper alignment of the contacts 76 to activate the interface device 70; donning the helmet 105; exercising control over the portable audio device 115 by speaking the necessary corresponding spoken commands into the microphone element 20 such as "volume up", "volume down", "next track", "previous track", "random", "shuffle" or the like to control the portable audio device 115; allowing the sound waves 92 of the spoken commands to be converted in the microphone circuitry 36, transmitted to the transceiver 82, interpreted and enacted in the microcontroller 84, sent to the portable audio device 115 via the contacts 76; permitting the portable audio device 115 to be adjusted and issue the altered electrical signal through the transceiver 82 to the ear bud receivers 66 via the wireless second signal 96; enjoying the selected output of the portable audio device 115 via the ear bud speakers 68 while normally engaging in the selected activity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A voice-activated audio controller, comprising:
   a mouthpiece capable of being removably mountable to an inside surface of a helmet worn by a user, comprising:
      a housing defining an interior space having a removable first face, said first face comprising a sound wave permeable open grill structure;

a microphone power source housed within said housing;
a microphone circuit in electrical communication with said microphone power source;
a microphone transmitter in electrical communication with said microphone circuit;
a mounting means capable of removably securing a second face of said housing to said helmet;
a pair of clamps, each comprising:
   a block having a plurality of ridges; and,
   a block channel secured within said block;
   wherein each said clamp is secured to a housing first side and a housing second side opposite said housing first side; and,
a pair of retainers, each comprising:
   a symmetrical and bifurcated claw having a first aperture superjacent to a second aperture;
   a retaining wire comprising an upper portion having a first free proximal end and a lower portion having a second free proximal end, thereby forming an open loop at a distal end;
   wherein said first free proximal end is secured within said housing through a first housing aperture located within said housing first side and subjacent a respective block;
   wherein said second free proximal end is secured within said housing through a second housing aperture located within said housing second side and subjacent a respective block;
   wherein each said claw is movably secured within a respective block channel;
   wherein each said retaining wire is movably secured with a respective claw; and
   wherein each said open loop is capable of being removably secured to a retaining structure located within said helmet;
a headset capable of being worn by said user; and,
an interface device capable of being removably connected to a portable audio device, said interface device in wireless communication with said mouthpiece and said headset;
wherein said portable audio device is remotely positioned on said user within a pre-determined range;
wherein said mouthpiece is capable of receiving spoken commands from said user;
wherein said microphone circuit converts said spoken commands directed into said first face to a first signal;
wherein said microphone transmitter transmits said first signal to said interface device;
wherein said spoken commands constitute a control parameter which provides operational control over said portable audio device; and,
wherein said interface device is capable of transmitting audio signals generated by said portable audio device to said headset.

2. The controller of claim 1, wherein said interface device comprises an interface housing, further comprising:
an interface connector having a plurality of contacts capable of electrically interconnecting with a control jack of said portable audio device;
a transceiver housed within said interface housing;
a microcontroller housed within said interface housing in electrical communication with said transceiver; and,
an output controller housed within said interface housing and in electrical communication with said microcontroller and said interface connector;
wherein said interface device is capable of obtaining power from an on-board power source of said portable audio device;
wherein said transceiver receives and amplifies said first signal from said mouthpiece;
wherein said microcontroller receives said first signal and issues an output command capable of operably controlling said portable audio device;
wherein said output controller receives said output command and transmits it to said interface connector; and,
wherein said transceiver is capable of converting an audio output from said portable audio device into a second signal and transmitting said second signal to said headset.

3. The controller of claim 2, wherein said headset further comprises a pair of ear buds each comprising:
an exterior face;
a handle secured to said exterior face;
a power source secured within each said ear bud;
an ear bud receiver in electrical communication with said power source; and,
an ear bud speaker in electrical communication with said ear bud receiver;
wherein said pair of ear buds are adapted to be inserted into ears of said user; and,
wherein each said ear bud receiver receives said second signal from said interface device and coverts it to an audio signal to be transmitted through said pair of ear buds.

4. The controller of claim 3, wherein said mounting means is a hook and loop fastener.

5. The controller of claim 3, wherein said spoken commands include:
"volume up", which increases a volume of said portable audio device;
"volume down", which decreases said volume of said portable audio device;
"next track", which skips to a subsequent track of a playlist on said portable audio device;
"previous track", which plays a previous track of said playlist on said portable audio device;
"random", which randomly plays a track on said playlist on said portable audio device; and,
"shuffle", which randomly sorts a listing of tracks of said playlist and commences playback on said portable audio device.

6. The controller of claim 1, wherein said first face comprises a sound wave permeable open grill structure.

7. The controller of claim 4, wherein said wireless communication between said mouthpiece, said headset, and said interface device incorporates BLUETOOTH® technology.

8. The controller of claim 7, wherein said mounting means is a hook and loop fastener.

9. The controller of claim 7, wherein said spoken commands include:
"volume up", which increases a volume of said portable audio device;
"volume down", which decreases said volume of said portable audio device;
"next track", which skips to a subsequent track of a playlist on said portable audio device;
"previous track", which plays a previous track of said playlist on said portable audio device;
"random", which randomly plays a track on said playlist on said portable audio device; and, "shuffle", which randomly sorts a listing of tracks of said playlist and commences playback on said portable audio device.

10. A voice-activated audio controller, comprising:
a helmet, having a mouthpiece removably mountable to an inside surface of said helmet worn by a user;
a headset capable of being worn by said user; and,
an interface device capable of being removably connected to a portable audio device, said interface device in wireless communication with said mouthpiece and said headset;
wherein said mouthpiece further comprises:
  a housing defining an interior space having a removable first face, said first face comprising a sound wave permeable open grill structure;
  a microphone power source housed within said housing;
  a microphone circuit in electrical communication with said microphone power source;
  a microphone transmitter in electrical communication with said microphone circuit;
  a mounting means capable of removably securing a second face of said housing to said helmet;
  a pair of clamps, each comprising:
    a block having a plurality of ridges; and,
    a block channel secured within said block;
    wherein each said clamp is secured to a housing first side and a housing second side opposite said housing first side;
  a pair of retainers, each comprising:
    a symmetrical and bifurcated claw having a first aperture superjacent to a second aperture;
    a retaining wire comprising an upper portion having a first free proximal end and a lower portion having a second free proximal end, thereby forming an open loop at a distal end;
    wherein said first free proximal end is secured within said housing through a first housing aperture located within said housing first side and subjacent a respective block;
    wherein said second free proximal end is secured within said housing through a second housing aperture located within said housing second side and subjacent a respective block;
    wherein each said claw is movably secured within a respective block channel;
    wherein each said retaining wire is movably secured with a respective claw; and,
    wherein each said open loop is capable of being removably secured to a retaining structure located within said helmet;
wherein said portable audio device is remotely positioned on said user within a pre-determined range;
wherein said mouthpiece is capable of receiving spoken commands from said user;
wherein said microphone circuit converts said spoken commands directed into said first face to a first signal;
wherein said microphone transmitter transmits said first signal to said interface device;
wherein said spoken commands constitute a control parameter which provides operational control over said portable audio device; and,
wherein said interface device is capable of transmitting audio signals generated by said portable audio device to said headset.

11. The controller of claim 10, wherein said interface device comprises an interface housing, further comprising:
  an interface connector having a plurality of contacts capable of electrically interconnecting with a control jack of said portable audio device;
  a transceiver housed within said interface housing;
  a microcontroller housed within said interface housing in electrical communication with said transceiver; and,
  an output controller housed within said interface housing and in electrical communication with said microcontroller and said interface connector;
  wherein said interface device is capable of obtaining power from an on-board power source of said portable audio device;
  wherein said transceiver receives and amplifies said first signal from said mouthpiece;
  wherein said microcontroller receives said first signal and issues an output command capable of operably controlling said portable audio device;
  wherein said output controller receives said output command and transmits it to said interface connector; and,
  wherein said transceiver is capable of converting an audio output from said portable audio device into a second signal and transmitting said second signal to said headset.

12. The controller of claim 11, wherein said headset further comprises a pair of ear buds each comprising:
  an exterior face;
  a handle secured to said exterior face;
  a power source secured within each said ear bud;
  an ear bud receiver in electrical communication with said power source; and,
  an ear bud speaker in electrical communication with said ear bud receiver;
  wherein said pair of ear buds are adapted to be inserted into ears of said user; and,
  wherein each said ear bud receiver receives said second signal from said interface device and coverts it to an audio signal to be transmitted through said pair of ear buds.

13. The controller of claim 12, wherein said mounting means is a hook and loop fastener.

14. The controller of claim 12, wherein said spoken commands include:
  "volume up", which increases a volume of said portable audio device;
  "volume down", which decreases said volume of said portable audio device;
  "next track", which skips to a subsequent track of a playlist on said portable audio device;
  "previous track", which plays a previous track of said playlist on said portable audio device;
  "random", which randomly plays a track on said playlist on said portable audio device; and,
  "shuffle", which randomly sorts a listing of tracks of said playlist and commences playback on said portable audio device.

15. The controller of claim 10, wherein said first face comprises a sound wave permeable open grill structure.

16. The controller of claim 13, wherein said wireless communication between said mouthpiece, said headset, and said interface device incorporates BLUETOOTH® technology.

17. The controller of claim 16, wherein said mounting means is a hook and loop fastener.

18. The controller of claim 16, wherein said spoken commands include:
  "volume up", which increases a volume of said portable audio device;

"volume down", which decreases said volume of said portable audio device;
"next track", which skips to a subsequent track of a playlist on said portable audio device;
"previous track", which plays a previous track of said playlist on said portable audio device;
"random", which randomly plays a track on said playlist on said portable audio device; and,
"shuffle", which randomly sorts a listing of tracks of said playlist and commences playback on said portable audio device.

\* \* \* \* \*